(12) United States Patent
Güntherberg et al.

(10) Patent No.: US 6,518,361 B1
(45) Date of Patent: Feb. 11, 2003

(54) THERMOPLASTIC MOLDING COMPOSITIONS

(75) Inventors: Norbert Güntherberg, Speyer (DE); Martin Weber, Maikammer (DE); Gerhard Lindenschmidt, Leimen (DE); Hans Peter Rath, Grünstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/647,674

(22) PCT Filed: Apr. 6, 1999

(86) PCT No.: PCT/EP99/02318

§ 371 (c)(1),
(2), (4) Date: Oct. 3, 2000

(87) PCT Pub. No.: WO99/54401

PCT Pub. Date: Oct. 28, 1999

(30) Foreign Application Priority Data

Apr. 17, 1998 (DE) .......................... 198 17 218

(51) Int. Cl.[7] .......................... C08L 25/12; C08L 51/00; C08L 53/02
(52) U.S. Cl. .......................... 525/70; 525/71; 525/85; 525/86; 525/87
(58) Field of Search .......................... 525/71, 85, 86, 525/87, 70; 523/201

(56) References Cited

U.S. PATENT DOCUMENTS

| 5,250,617 A | 10/1993 | Piejko |
| 5,747,586 A | 5/1998 | Koehler |
| 5,760,134 A | 6/1998 | Guentherberg |
| 5,877,258 A | 3/1999 | Guentherberg |

FOREIGN PATENT DOCUMENTS

| DE | 2020 478 | 11/1972 |
| DE | 42 11 412 | 10/1993 |
| EP | 526 813 | 2/1993 |
| EP | 693 530 | 1/1996 |
| EP | 708 145 | 4/1996 |
| EP | 767 213 | 4/1997 |

OTHER PUBLICATIONS

Amoco Polybutene/Amoco Chem.Co., Bul.12–N, (1994).
Amoco Polybutenes Physical Properties, Bu.12–23 (1995).
Acrylonitrile–Butadiene...6/95,Heinrich,1–26.

*Primary Examiner*—Jeffrey Mullis
(74) *Attorney, Agent, or Firm*—Keil & Weinkauf

(57) ABSTRACT

Thermoplastic molding compositions are made from

A) from 20 to 98% by weight of a particulate graft polymer and a non-elastomeric graft shell
B) from 0.5 to 78.5% by weight of a thermoplastic styrene polymer or copolymer
C) from 1 to 79% by weight of a second styrene copolymer and
D) from 0.5 to 30% by weight of an isobutene polymer.

12 Claims, No Drawings

THERMOPLASTIC MOLDING COMPOSITIONS

The present invention relates to thermoplastic molding compositions made from

A) from 20 to 98% by weight of a particulate graft polymer made from
- a1) from 30 to 90% by weight of an elastomeric graft core made from
  - a11) from 80 to 99.99% by weight of a $C_1$–$C_{10}$-alkyl acrylate,
  - a12) from 0.01 to 20% by weight of at least one crosslinking monomer, and
  - a13) from 0 to 19.99% by weight of one or more other monomers,
- a2) from 10 to 70% by weight of a graft shell made from
  - a21) from 50 to 100% by weight of a styrene compound of the formula I

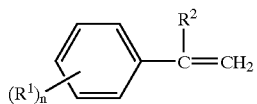

where $R^1$ and $R^2$ are hydrogen or $C_1$–$C_8$-alkyl and n is 0, 1, 2 or 3,
  - a22) from 0 to 50% by weight of at least one monoethylenically unsaturated nitrile compound, and
  - a23) from 0 to 40% by weight of one or more other monomers, B) from 0.5 to 78.5% by weight of a thermoplastic polymer made from
- b1) from 50 to 100% by weight of a styrene compound of the formula

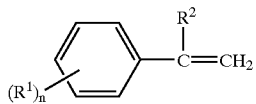

where $R^1$ and $R^2$ are hydrogen or $C_1$–$C_8$-alkyl and n is 0, 1, 2 or 3,
- b2) from 0 to 50% by weight of at least one monoethylenically unsaturated nitrile compound, and
- b3) from 0 to 40% by weight of one or more other monomers, C) from 1 to 79% by weight of a copolymer made from
- c1) from 30 to 90% by weight of styrene and/or α-methylstyrene,
- c2) from 10 to 70% by weight of butadiene, and
- c3) from 0 to 30% by weight of one or more other monomers in which all, or virtually all, of the olefinic double bonds have been hydrogenated, and D) from 0.5 to 30% by weight of a copolymer made from
- d1) from 50 to 100% by weight of isobutene, and
- d2) from 0 to 50% by weight of one or more other monomers.

The invention further relates to the use of these molding compositions for producing films and moldings, and also to films and moldings made from these molding compositions and to a process for preparing the molding compositions.

The total of components A) to D) is, of course, 100% by weight.

There are many application sectors for plastic films. They are mostly produced by calendering or extrusion.

EP-A 526 813 has disclosed thermoplastic molding compositions made from a highly crosslinked acrylate rubber with a graft shell made from methyl methacrylate or styrene/acrylonitrile and with a partially crosslinked acrylate rubber and with an ethylene/vinyl acetate copolymer, and also if desired with another polymer based on styrene and/or acrylic compounds. Under the conditions of molding, for example to give films, these compositions tend, however, to give undesirable discoloration.

DE-A 42 11 412 has proposed, as a film material, mixtures of styrene/acrylonitrile polymers and thermoplastics, which have a graft shell made from an elastomeric polymer. However, the process for preparing graft polymers of this type is complicated and it is therefore difficult to obtain consistent product quality.

EP-A 708 145 has disclosed thermoplastic molding compositions which comprise an acrylate rubber with a graft shell made from styrene-acrylonitrile, and comprise a hard styrene-acrylonitrile matrix and a hydrogenated copolymer made from styrene and butadiene. The films obtainable therefrom are very tough and tear-resistant. However, the flowability of the molding compositions is not always adequate for extrusion processing, and therefore the reliability of the extrusion process, and also the quality of the extruded film product, are not fully satisfactory.

EP-A 693 530 teaches improvement of the impact strength of mixtures made from polycarbonate and diene graft rubbers or alkyl acrylate graft rubbers, by using functionalized polyisobutylene polymers. In DE-A 20 20 478 polyisobutene (PIB), also termed polyisobutylene, is used concomitantly in blends made from thermoplastics to improve the dielectric properties of the molding composition.

In an Amoco company publication "Amoco Polybutene" which appeared in 1994 it is reported on page 18 that polybutene improves the impact strength and elasticity of a wide variety of thermoplastics. The Amoco company publication of June 1995 "Acrylonitrile-Butadiene-Styrene Modification using Amoco Polybutene" discloses on page 5 that polybutene improves the impact strength of ABS (acrylonitrile-butadiene-styrene).

It is not disclosed in any of the publications mentioned that polybutene considerably improves the flowability and therefore the extrusion performance of films made from ASA (acrylonitrile-styrene-acrylate).

It is an object of the present invention to overcome the disadvantages described at the outset. A particular object is to provide molding compositions which have good flowability and good extrusion properties and can be extruded with high reliability of the process to give films or moldings of consistent product quality, and also having good and well balanced mechanical properties.

We have found that this object is achieved by means of the thermoplastic molding compositions defined at the outset.

The invention provides, furthermore, the use of the polymer mixture for producing films and moldings, and also films and moldings made from these compositions.

Component A) is present in the novel molding compositions in a proportion of from 20 to 98% by weight, preferably from 40 to 90% by weight and particularly preferably from 50 to 82% by weight, based on the total of components A) to D). This component is a particulate graft copolymer which has been built up from an elastomeric graft core a1) (soft component) and, grafted onto this, a shell a2) (hard component).

The graft core a1) is present in a proportion of from 30 to 90% by weight, preferably from 40 to 80% by weight and in particular from 50 to 75% by weight, based on component A).

The graft core a1) is obtained by polymerizing a monomer mixture made from, based on a1), a11) from 80 to 99.99% by weight, preferably from 85 to 99.5% by weight and particularly preferably from 90 to 99% by weight, of a $C_1-C_{10}$-alkyl acrylate, a12) from 0.01 to 20% by weight, preferably from 0.5 to 10% by weight and particularly preferably from 1 to 5% by weight, of at least one crosslinking monomer, and a13) from 0 to 19.99% by weight, preferably from 0 to 5% by weight, of one or more other monomers.

Particularly suitable alkyl acrylates a11) are ethyl acrylate, 2-ethylhexyl acrylate and especially n-butyl acrylate.

Crosslinking monomers a12) are bi- or polyfunctional comonomers, such as butadiene and isoprene, divinyl esters of dicarboxylic acids, such as succinic acid or adipic acid, diallyl or divinyl ethers of dihydric alcohols, such as of ethylene glycol or of 1,4-butanediol, diesters of acrylic acid and methacrylic acid with the dihydric alcohols mentioned, 1,4-divinylbenzene or triallyl cyanurate. Particular preference is given to the acrylate of tricyclodecenyl alcohol, known as dihydrodicyclopentadienyl acrylate, and also to the allyl esters of acrylic and methacrylic acids.

Replacing some of the monomers a11) and a12) in the graft core a1) of the molding compositions there may also be other monomers a13) which vary the mechanical and thermal properties of the core within a certain range. Examples which may be mentioned of such monoethylenically unsaturated comonomers are:

vinylaromatic monomers, such as styrene or styrene derivatives of the formula I

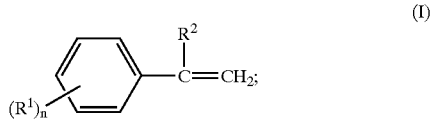

(I)

where $R^1$ and $R^2$ are hydrogen or $C_1-C_8$-alkyl and n is 0, 1, 2 or 3;

acrylonitrile, methacrylonitrile;

acrylic acid, methacrylic acid, dicarboxylic acids, such as maleic and fumaric acids, and also the anhydrides of these, such as maleic anhydride;

nitrogen-functional monomers, such as dimethylaminoethyl acrylate, diethylaminoethyl acrylate, vinylimidazole, vinylpyrrolidone, vinylcaprolactam, vinylcarbazole, vinylaniline and acrylamide;

$C_1-C_4$-alkyl methacrylates, such as methyl methacrylate, ethyl methacrylate, n-propyl methacrylate, isopropyl methacrylate, n-butyl methacrylate, isobutyl methacrylate, sec-butyl methacrylate, tert-butyl methacrylaue and hydroxyethylmethacrylate;

aromatic and araliphatic esters of acrylic or methacrylic acid, such as phenyl acrylate, phenyl methacrylate, benzyl acrylate, benzyl methacrylate, 2-phenylethyl acrylate, 2-phenylethyl methacrylate, 2-phenoxyethyl acrylate and 2-phenoxyethyl methacrylate;

unsaturated ethers, such as vinyl methyl ether;

and also mixtures of these monomers.

The graft shell a2) is present in a proportion of from 10 to 70% by weight, preferably from 20 to 60% by weight and particularly preferably from 25 to 50% by weight, based on component A).

The graft shell a2) is obtained by polymerizing a monomer mixture made from, based on a2), a21) from 50 to 100% by weight, preferably from 60 to 95% by weight and particularly preferably from 65 to 85% by weight, of a styrene compound of the formula I

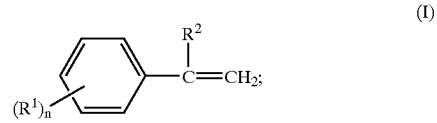

(I)

where $R^1$ and $R^2$ are hydrogen or $C_1-C_8$-alkyl and n is 0, 1, 2 or 3, a22) from 0 to 50% by weight, preferably from 0 to 40% by weight and particularly preferably from 5 to 35% by weight, of at least one monoethylenically unsaturated nitrile compound, and a23) from 0 to 40% by weight, preferably from 0 to 20% by weight, of one or more other monomers.

The styrene compound used of the formula (I) (component a21)) is preferably styrene, α-methylstyrene or a $C_1-C_8$-alkyl-ring-alkylated styrene, such as p-methylstyrene or tert-butylstyrene. Styrene is particularly preferred.

Possible monoethylenically unsaturated nitrile compounds a22) are acrylonitrile, methacrylonitrile and mixtures of these, in particular acrylonitrile.

Replacing some of the monomers a21) or a22) there may also be other comonomers a23) building up the shell a2). The recommendations made for component a13) also apply to component a23), and additional monomers which may be mentioned are maleic anhydride and N-substituted maleimides, such as N-methyl-, N-phenyl- and N-cyclohexylmaleimide. The use of these is preferred.

The graft shell a2) preferably has a structure made from styrene or from a mixture of from 65 to 85% by weight of styrene, the remainder being acrylonitrile.

The graft polymers A) are obtainable in a known manner, preferably by emulsion polymerization at from 30 to 80° C. Examples of emulsifiers suitable for this are alkali metal salts of alkyl- or alkylarylsulfonic acids, or are alkyl sulfates, fatty alcohol sulfonates, salts of higher fatty acids having from 10 to 30 carbon atoms, sulfosuccinates, ether sulfonates or resin soaps. Alkali metal salts of alkylsulfonates or fatty acids having from 10 to 18 carbon atoms are preferred.

In preparing the dispersion it is preferable to use an amount of water sufficient to give the finished dispersion a solids content of from 20 to 50% by weight.

Possible polymerization initiators are preferably free-radical generators, such as peroxides, preferably peroxosulfates, such as potassium peroxodisulfate, and azo compounds, such as azodiisobutyronitrile. However, it is also possible to use redox systems, in particular those based on hydroperoxides, such as cumene hydroperoxide. Concomitant use may also be made of molecular weight regulators, such as ethylhexyl thioglycolate, tert-dodecyl mercaptan, terpinols or dimeric α-methylstyrene.

To maintain a constant pH, preferably from 6 to 9, concomitant use may be made of buffer substances, such as $Na_2HPO_4/NaH_2PO_4$ or sodium hydrogencarbonate.

Emulsifiers, initiators, regulators and buffer substances are used in the usual amounts, and further details concerning this are therefore unnecessary.

The graft core a1) may particularly preferably also be prepared by polymerizing the monomers a11) to a13) in the presence of a finely divided latex made from elastomeric or hard polymers (known as the seed latex polymerization procedure). Use may be made, for example, of a seed latex made from crosslinked poly-n-butyl acrylate or from polystyrene.

It is also possible in principle to prepare the graft core a1) by a process other than emulsion polymerization, for example by bulk or solution polymerization, and subsequently to emulsify the resultant polymers. Microsuspension polymerization is also suitable, preferably using oil-soluble initiators, such as lauroyl peroxide or tert-butyl perpivalate. The processes for this are known.

The graft shell a2) may be prepared under the conditions used for preparing the graft core a1). The shell a2) may be prepared in one or more steps. It is possible, for example, firstly to polymerize styrene and/or α-methylstyrene alone and then styrene and acrylonitrile in two steps in succession. Other details on the preparation of the graft polymers A) have been described in DE-OS 12 60 135 and 31 49 358.

The reaction conditions are preferably balanced in a manner known per se in such a way that the particulate graft polymers A have a very uniform diameter $d_{50}$ in the range from 60 to 1500 nm, in particular from 150 to 1000 nm and very particularly from 200 to 700 nm.

In preparing the novel thermoplastic compositions it is also possible, instead of a single graft polymer A), to use a variety of these polymers, especially those with markedly different particle sizes. Mixtures of this type with bimodal size distribution can give advantages related to process technology during further processing. Suitable ranges of particles diameters are firstly from 60 to 200 nm and secondly from 300 to 1000 nm. A bimodal particle size distribution may be achieved, for example, by partial agglomeration, as described in DE-B 2 427 960.

Other suitable graft polymers are those having more than one soft and hard shells, e.g. of the structure a1)-a2)-a1)-a2) or a2)-a1)-a2), especially in cases where the particles are relatively large.

If there are any ungrafted polymers produced from the monomers a2) during the grafting, these amounts, which are generally less than 10% of a2), are counted as part of the weight of component A) and not of component B), which may have a structure made from the same monomers.

Component B) of the novel molding composition is present in a proportion of from 0.5 to 78.5% by weight, preferably from 5 to 50% by weight and particularly preferably from 10 to 30% by weight, based on the total of components A) to D). Constituent B) is a thermoplastic polymer which is composed of b1) from 50 to 100% by weight, preferably from 60 to 95% by weight and particularly preferably from 65 to 85% by weight, of a styrene compound of the formula I

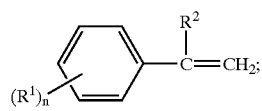

where $R^1$ and $R^2$ are hydrogen or $C_1$–$C_8$-alkyl and n is 0, 1, 2 or 3, b2) from 0 to 50% by weight, preferably from 0 to 40% by weight and particularly preferably from 5 to 35% by weight, of at least one monoethylenically unsaturated nitrile compound, and b3) from 0 to 40% by weight, preferably from 0 to 20% by weight, of one or more other monomers, based in each case on component B). Possible monoethylenically unsaturated nitrile compounds b2) are acrylonitrile, methacrylonitrile and mixtures of these, in particular acrylonitrile. Possible monomers b3) are those which have been mentioned for component a13) and a23).

Molding compositions for producing films preferably comprise from 0.5 to 50% by weight of component B, based on the total of components A) to D).

Polymers B), which due to their principal components styrene and acrylonitrile are generally also known as SAN polymers, are known and are in some cases also available commercially. They generally have a viscosity number VN (determined in accordance with DIN 53 726 at 25° C., 0.5% by weight in dimethylformamide) of from 40 to 160 ml/g, corresponding to an average molecular weight of from about 40000 to 2000000. They are obtained in a known manner by bulk, solution, suspension, precipitation or emulsion polymerization. Details of these processes are described, for example, in Kunststoffhandbuch, ed. R. Vieweg and G. Daumiller, Vol. V "Polystyrol", Carl-Hanser-Verlag, Munich, 1969, pp. 118 ff.

In the case of the monomers a21) and/or b1) it is also possible, instead of the styrene compounds or in a mixture with them, to use $C_1$–$C_8$-alkyl acrylates and/or methacrylates, particularly those which derive from methanol, ethanol, n- or isopropanol, sec-, tert- or isobutanol, pentanol, hexanol, heptanol, octanol or 2-ethylhexanol, and particularly from n-butanol. Particular preference is given to methyl methacrylate.

The proportion of component C) in the molding compositions, based on the total of components A) to D), is from 1 to 79% by weight, preferably from 4.9 to 50% by weight and particularly preferably from 7.5 to 39.5% by weight. Component C) is a copolymer composed of c1) from 30 to 90% by weight, preferably from 40 to 80% by weight and particularly preferably from 45 to 70% by weight, of styrene and/or α-methylstyrene, c2) from 10 to 70% by weight, preferably from 20 to 60% by weight and particularly preferably from 30 to 55% by weight, of butadiene, and c3) from 0 to 20% by weight, preferably from 0 to 10% by weight, of one or more other monomers, in which some or all of the olefinic double bonds have been hydrogenated.

Possible components $c_3$) are any of the compounds which can be polymerized anionically, and also mixtures of these, in particular isoprene, alkyl methacrylates, such as methyl methacrylate and tert-butyl methacrylate, α-methylstyrene, dimethylbutadiene, and particularly preferably ring-substituted styrenes and 1,1-diphenylethylene.

The copolymers C) are known and are also in some cases commercially available (e.g. Kraton® from Shell Chemicals and Glissoviscal® from BASF) and are obtainable in a manner known per se.

The copolymers are preferably prepared by anionic polymerization in solution. The initiators used are principally organometallic compounds, such as sec-butyllithium. The product of the anionic polymerization, as is generally desired, is a polymer which is essentially unbranched. If a mixture of styrene and butadiene is subjected to the polymerization, the polymers obtained, depending on the copolymerization conditions selected, have a characteristic distribution of the monomer units.

Preference should generally be given to block copolymers in which one chain end is formed from a block made from styrene and the other chain end is formed from a block made from butadiene. These blocks may be separated from one another by polymers with random distribution, and the blocks may also contain subordinate amounts of the respective other monomer.

If a mixture of styrene and butadiene is polymerized anionically with one of the initiators mentioned and concomitant use of small amounts of an ether, in particular tetrahydrofuran (THF) as a cocatalyst, the polymer chains produced have neither blocks nor a completely random distribution of the structural units. Rather, the proportion of one of the components increases along the chain in one direction and the proportion of the other component decreases in the same direction.

At the start of the polymerization it is preferable to incorporate butadiene, with a small amount of styrene, into the chains produced. They are therefore rich in butadiene. As the reaction proceeds and the reaction mixture therefore has a falling butadiene monomer content, styrene monomer molecules are increasingly polymerized, and the chain becomes richer in styrene, until finally after the butadiene has been entirely consumed a terminal segment is formed from homopolystyrene. Details of the process have been described in DE-A 31 06 959.

Other suitable polymers have a star-shaped structure, obtained by linking a number of polymer chains, principally of block copolymers of styrene block/butadiene block/styrene block ("three-block polymer") type, via polyfunctional molecules. Examples of suitable linking agents are polyepoxides, such as epoxidized linseed oil, polyisocyanates, such as 1,2,4-triisocyanatobenzene, polyketones, such as 1,3,6-hexanetrione and polyanhydrides, and also dicarboxylic esters, such as diethyl adipate, and silicon halides, such as $SiCl_4$, metal halides, such as $TiCl_4$ and polyvinylaromatics, such as divinylbenzenes. Further details of the preparation of these polymers may be found, for example, in DE-A 26 10 068.

The polymers C) mentioned may also comprise other copolymerized monomers $c_3$), possible compounds for which are the anionically polymerizable compounds mentioned for c3).

Suitable solvents for the polymerization of the monomers c1) to c3) are anhydrous liquids, such as alkanes and cycloaliphatic and aromatic hydrocarbons. The use of cyclohexane is preferred.

The anionic polymerization is preferably carried out at from −20 to 150° C.

The reaction is terminated in a known manner by adding a polar compound, such as water or an alcohol.

The hydrogenation of the olefinic double bonds still present in the polymer and deriving from butadiene is likewise carried out in a manner known per se, preferably in a homogeneous phase with hydrogen, using a soluble selective hydrogenation catalyst, such as a mixture of nickel(II) acetylacetonate and triisobutylaluminum in an inert solvent, such as hexane. The hydrogenation temperature is preferably from 20 to 200° C. and it is advantageous to use a hydrogen pressure in the range from 6 to 30 bar. Complete hydrogenation of the nonaromatic double bonds is not necessary. Rather, a degree of hydrogenation of 95% is sufficient. More details on the hydrogenation may be found, for example, in the abovementioned DE-A 31 06 959.

The work-up to give the desired polymers, whose molecular weights may be adjusted by varying the temperature and duration of the polymerization, and also the amounts of monomers, preferably to from 50000 to 200000, in particular from 70000 to 120000, is carried out as usual by removing the hydrogenation catalyst and taking off the solvent, e.g. by direct devolatilization.

In the case of polymers with a terminal homopolystyrene block the proportion of component C) is from to 30% by weight, preferably from 7 to 25% by weight.

The proportion of component D) in the molding compositions, based on the total of components A) to D), is from 0.5 to 30% by weight, preferably from 0.1 to 20% by weight and in particular from 0.5 to 10% by weight. Component D) is a copolymer which is composed of d1) from 50 to 100% by weight, preferably from 70 to 100% by weight and in particular from 80 to 100% by weight, of isobutene, and d2) from 0 to 50% by weight, preferably from 0 to 30% by weight and in particular from 0 to 20% by weight, of one or more other monomers, based in each case on D). Isobutene is also termed isobutylene. Possible comonomers d2) are: butene, styrene and styrene compounds of the formula I, such as α-methylstyrene, isoprene, indene, butadiene, cyclopentadiene, and also vinyl- and vinylidene-terminated olefins, and the olefins known as internal olefins having from 3 to 14 carbon atoms, such as 2-methyl-2-pentene and 2-methyl-1-pentene, 2,4,4-trimethyl-2-pentene and 2,4,4-trimethyl-1-pentene, cis- and trans-2-butene, 1-butene, 1-hexene, 1-octene and 1-decene.

The polymers D) are usually termed polyisobutene (polyisobutylene or PIB), corresponding to their principal component isobutene (isobutylene). At room temperature, depending on the molecular weight, they are generally viscous-oily (average molecular weight $\overline{M}_N$ from about 300 to 600), oily-highly tacky ($\overline{M}_N$ from about 700 to 2000), highly viscous-highly tacky ($\overline{M}_N$ from about 2000 to 10000), highly viscous-low tack ($\overline{M}_N$ from about 10000 to 120000) to rubbery elastomeric ($\overline{M}_N$ from about 300000 to 2500000).

Depending on the product properties desired, the component D) used may be polyisobutene homo- or copolymers. The comonomer proportion d2) is preferably less than 20% by weight, based on D), and particular preference is given to the use of polyisobutene homopolymer.

As already mentioned, the polyisobutenes are usually characterized by molecular weight (e.g. as the number-average $\overline{M}_N$). Polyisobutenes of very different molecular weights may be used as component D), in particular those with average molecular weights $\overline{M}_N$ in the range from 100 to 1000000, preferably from 100 to 100000, in particular from 500 to 10000.

The copolymers D) are known and commercially available, e.g. as Glissopal® (BASF), Hyvis® or Ultravis® (BP) or Indopol® (Amoco).

The polyisobutene homo- or copolymers (component D)) are generally prepared by cationic polymerization at low temperatures. These processes are known to the person skilled in the art and are described, for example, in U.S. Pat. No. 5,286,823 and in Kunststoff-Handbuch, Vol. VI Polyolefine, Carl Hanser Verlag, Munich, 1969, and in Ullmanns Encyclopadie der Technischen Chemie, 4th ed., Vol. 19, p. 216.

Besides components A), B), C) and D), the thermoplastic molding compositions may also comprise additives, such as lubricants, mold-release agents, pigments, dyes, flame retardants, antioxidants, stabilizers to protect against the action of light, fibrous or pulverulent fillers, fibrous or pulverulent reinforcing agents, and antistats, in the amounts usual for these agents.

The novel molding compositions may be prepared by mixing processes known per se, for example with melting in a mixing apparatus, e.g. in an extruder, Banbury mixer, kneader, roll mill or calender, at from 150 to 300° C. However, the components may also be mixed "cold", without melting, and the mixture composed of powder or pellets not melted and homogenized until it is processed.

The molding compositions may be used to produce moldings of any type, in particular films. The films may be produced by extrusion, rolling or calendering, or other processes known to the person skilled in the art, usually at from 150 to 280° C. Preference is given to the production of films from the molding compositions by extrusion. For this, the novel molding compositions are shaped to give a processable film, by heating and/or friction alone or with concomitant use of plasticizing or other additives. Extruders with slot dies, for example, are suitable for this. The films usually have a thickness of from 0.05 to 2 mm. The processing of films of this type to give finished products is carried out., for example, by thermoforming, usually at from 120 to 170° C.

The novel molding compositions may also be used for coextrusion together with other polymers, giving coextruded moldings or coextruded films. Examples of other polymers of this type are acrylonitrile-butadiene-styrene (ABS), acrylonitrile-styrene-acrylate (ASA), polybutylene terephthalate or polyethylene terephthalate (PBT and PET, respectively), polyvinyl chloride (PVC), polystyrene-acrylonitrile (SAN), methyl methacrylate-ABS (MABS) and other commonly used thermoplastic polymers.

The films may be used in a wide variety of ways, for example in the automotive industry for construction of automobile interiors, for decorative uses, as a leather substitute in the production of cases and bags, and in the furniture industry as a covering material for laminating the surfaces of furniture.

The novel thermoplastic molding compositions contain no halogen, they are very substantially free from constituents which escape by evaporation or bleeding, and during processing they show virtually no disadvantageous changes, such as discoloration. In particular, even without concomitant use of appropriate stabilizers or other additives, they have excellent heat-aging resistance and light resistance, and also good mechanical properties.

In particular, the novel molding compositions have good flowability, especially during extrusion processing. The good extrusion properties of the molding compositions give rise to very consistent product quality in the films.

EXAMPLES

The following constituents were prepared (all percentages are percentages by weight).

Preparation of a Component A
A Particulate Graft Polymer made from Crosslinked Poly-n-butyl Acrylate (Core) and Styrene-acrylonitrile Copolymer (Shell)

A mixture of 98 g of n-butyl acrylate and 2 g of dihydrodicyclopentadienyl acrylate and, separately from this, a solution of 1 g of Na $C_{12}$–$C_{18}$ paraffinsulfonate in 50 g of water, were added to a mixture of 3 g of a polybutyl acrylate seed latex, 100 g of water and 0.2 g of potassium persulfate over the course of 4 hours at 60° C. The polymerization was then continued for 3 hours. The average particle diameter $d_{50}$ of the resultant latex was 430 nm, with narrow particle size distribution (Q 0.1).

150 g of this latex were mixed with 60 g of water, 0.03 g of potassium persulfate and 0.05 g of lauroyl peroxide. 20 g of styrene were then firstly grafted onto the latex particles over the course of 3 hours at 65° C., followed by, over the course of a further 4 hours, a mixture of 15 g of styrene and 5 g of acrylonitrile. The polymer was then precipitated using a calcium chloride solution at 95° C., separated off, washed with water and dried in a stream of warm air. The degree of grafting of the polymer was 35% and the particles had an average diameter $d_{50}$ of 510 nm.

The makeup of the graft polymer was as follows (rounded values):

60% by weight of a graft core made from polybutyl acrylate, crosslinked,

20% by weight of an inner graft made from styrene polymer, and

20% by weight of an outer graft made from styrene-acrylonitrile copolymer in a weight ratio S/AN of 3:1.

The seed polymer used at the outset had been prepared by the process of EP-B 6503 (column 12, line 55, to column 13, line 22) by polymerizing n-butyl acrylate and tricyclodecenyl acrylate in aqueous emulsion, and had a solids content of 40%.

The average particle size mentioned in the description of component A) is the weight-average of the particle sizes.

The average diameter is the $d_{50}$, denoting that 50% of all the particles have a smaller diameter, and 50% by weight a larger diameter, than the diameter corresponding to the $d_{50}$. To characterize the breadth of the particle size distribution the $d_{10}$ and $d_{90}$ values are frequently given in addition to the $d_{50}$. 10% by weight of all of the particles are smaller, and 90% by weight are larger, than the $d_{10}$ diameter. In a similar way, 90% by weight of all of the particles have a smaller diameter, and 10% by weight a larger diameter, than the diameter corresponding to the $d_{90}$. The quotient $Q=(d_{90}-d_{10})/d_{50}$ is a measure of the breadth of the particle size distribution. A smaller Q indicates a narrower distribution.

Preparation of a Component B
Copolymer Made From Styrene and Acrylonitrile

A copolymer was prepared from 65% by weight of styrene and 35% by weight of acrylonitrile (component B) by the continuous solution polymerization process, as described in Kunststoff-Handbuch, ed. R. Vieweg and G. Daumiller, Vol. V "Polystyrol", Carl-Hanser-Verlag, Munich, 1969, pp. 122–124. The viscosity number VN (determined in accordance with DIN 53 726 at 25° C., 0.5% by weight in dimethylformamide) was 80 ml/g.

Preparation of a Component C
Hydrogenated Styrene-butadiene Copolymer

A solution of 520 g of styrene, 480 g of butadiene and 20 ml of tetrahydrofuran in 4 l of cyclohexane was firstly mixed slowly with sec-butyllithium at 0° C., to deactivate contaminants with active protons. Once the polymerization reaction had begun, discernible from a temperature rise of 0.2° C., 0.8 g of sec-butyllithium were added immediately. The heat of polymerization was dissipated by evaporative cooling. The cooling rate here was set in such a way that the temperature rose to 120° C. within a period of 30 min. This temperature was held for a further 10 min, and the polymerization was then terminated by adding 1 g of ethanol.

For hydrogenation, a suspension of 1.5 g of nickel(II) acetylacetonate in 30 ml of toluene and 34 ml of a 20% by weight solution of triisobutylaluminum in hexane were added to the resultant polymer solution which was then subjected for 60 min to a hydrogen pressure of 15 bar at from 80 to 110° C.

The work-up of the reaction mixture to give the hydrogenated polymer was carried out as usual with removal of the nickel catalyst. It was advantageous to take off the solvent in a direct devolatilization system.

The styrene content of the resultant polymer, which is obtainable commercially as Glissoviscal® SG (BASF), was 52% by weight, based on the total weight of the polymer. The proportion of the terminal homopolystyrene block in the polymer was 13% by weight. The average molecular weight of the product prepared in the manner described, determined by gel permeation chromatography, was 80000.

Component D
Polyisobutene Homopolymer

A commercially available polyisobutene homopolymer with an average molecular weight (number-average $\overline{M}_N$) of 2400 was used. Its preparation is described in U.S. Pat. No. 5,286,823. It is obtainable commercially from BASF as Glissopal® 2300.

Molding Compositions Prepared and the Properties of These

Components A to D were intimately mixed with melting at 240° C. and 250 rpm on a twin-screw ZSK30 Werner+Pfleiderer extruder, discharged and pelletized. The pellets were extruded in a single-screw extruder of Haake Rheocord 90/single-screw 3:1 type at 220° C. and from 160 to 220 rpm, to give a film of 0.6 mm thickness, using a slot die with a die gap of 0.5 mm.

The following properties were determined for the film:

tensile strength: the tensile test was carried out in accordance with DIN 53 504 on strips which had been stamped out from the film.

elongation at break: the elongation when the breaking stress was applied was determined in accordance with DIN 53 504 from the tensile test and given as a percentage of the original dimension of the strip.

tear propagation: a tear propagation test in accordance with DIN 43 515 was carried out on strips which had been stamped out.

Shore hardness: Shore hardness was determined in accordance with DIN 43 505 using test apparatus D.

heat resistance: this was determined as Vicat number in accordance with DIN 53 460 using test method A.

The flowability of the molding compositions was determined on pellets, by measuring the melt volume ratio (MVR) at 220° C. and with a load of 10 kg and 21.6 kg, respectively.

The makeups of the films produced and the test results are given in Table 1.

TABLE 1

| Experiment No. | 1c | 1 | 2 | 3 | 2c |
|---|---|---|---|---|---|
| Makeup [parts by weight]: | | | | | |
| Component A | 80 | 79.2 | 77.6 | 76 | 85 |
| Component B | 10 | 9.9 | 9.7 | 9.5 | 10 |
| Component C | 10 | 9.9 | 9.7 | 9.5 | 0 |
| Component D | 0 | 1 | 3 | 5 | 5 |
| Properties: | | | | | |
| Tensile strength [N/mm²] | 14 | 16 | 16 | 15 | n.d. |
| Elongation at break [%] | 155 | 135 | 146 | 139 | n.d. |
| Tear propagation resistance [N/mm²] | 44 | 54 | 60 | 47 | n.d. |
| Shore D hardness | 50 | 50 | 50 | 48 | 45 |
| MVR (220° C./10 kg) | 0.2 | 0.5 | 0.9 | 1.3 | <0.2 |
| MVR (220° C./21.6 kg) | 12 | 18 | 25 | 32 | 13 | c comparative experiment
n.d. = not determined, since no utilizable films could be extruded.

Films made from molding compositions which do not comprise component D (comparative experiment 1c) showed reduced tear propagation resistance and in particular considerably lower flowability (MVR). In contrast, films made from the novel molding compositions have good flowability (experiments 1 to 3) as well as well balanced mechanical properties.

Molding compositions which do not comprise component C could not be extruded to give utilizable films, as shown by comparative experiment 2c.

48954S_2.RTF typed by CH on 13.1.1999. Time taken=5 min.

We claim:

1. A thermoplastic molding composition made from
A) from 20 to 98% by weight of a particulate graft polymer made from
 a1) from 30 to 90% by weight of an elastomeric graft core made from
  a11) from 80 to 99.99% by weight of a $C_1$–$C_{10}$-alkyl acrylate,
  a12) from 0.01 to 20% by weight of at least one crosslinking monomer, and
  a13) from 0 to 19.99% by weight of one or more other monomers,
 a2) from 10 to 70% by weight of a graft shell made from
  a21) from 50 to 100% by weight of a styrene compound of the formula I

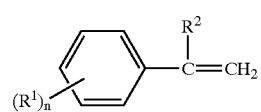

where $R^1$ and $R^2$ are hydrogen or $C_1$–$C_8$-alkyl and n is 0, 1, 2 or 3, or a $C_1C_8$-acrylate or methacrylate or a mixture of both,
  a22) from 0 to 50% by weight of at least one monoethylenically unsaturated nitrile compound, and
  a23) from 0 to 40% by weight of one or more other monomers,
B) from 0.5 to 78.5% by weight of a thermoplastic polymer made from
 b1) from 50 to 100% by weight of a styrene compound of the formula

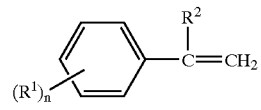

where $R^1$ and $R^2$ are hydrogen or $C_1$–$C_8$-alkyl and n is 0, 1, 2 or 3, or a $C_1C_8$-acrylate or methacrylate or a mixture of both,
 b2) from 0 to 50% by weight of at least one monoethylenically unsaturated nitrile compound, and
 b3) from 0 to 40% by weight of one or more other monomers,
C) from 1 to 79% by weight of a copolymer different from "B" made from
 c1) from 30 to 90% by weight of styrene and/or α-methylstyrene,
 c2) from 10 to 70% by weight of butadiene, and
 c3) from 0 to 30% by weight of one or more other monomers in which 95% to all of the olefinic double bonds have been hydrogenated, and D) from 0.5 to 30% by weight of an isobutene homopolymer.

2. A thermoplastic molding composition as claimed in claim 1, where component C) has been prepared by anionic polymerization followed by hydrogenation.

3. A thermoplastic molding composition as claimed in claim 2, where the anionic polymerization to prepare component C) has been carried out with the aid of lithium alkyl compounds, and also in the presence of tetrahydrofuran.

4. A thermoplastic molding composition as claimed in claim 1, where component D) is a homopolymeric polyisobutene.

5. A thermoplastic molding composition as claimed in claim 1, where component D) is composed of d1) from 50 to 100% by weight of isobutene, and d2) from 0 to 50% by weight of olefins or of styrene compounds of the formula I.

6. A thermoplastic molding composition as claimed in claim 1, where the particulate graft polymer A) has an average particle diameter $d_{50}$ of from 200 to 700 nm.

7. A film made from the thermoplastic molding composition as claimed in claim 1.

8. A process for preparing the thermoplastic molding composition as claimed claim 1, which comprises mixing, with melting at from 150 to 300° C., in a mixing apparatus, components A) to D) and, if desired, conventional additives.

9. A thermoplastic molding composition as claimed in claim 1, wherein a21) and b1) are both the styrene compound of formula I.

10. A thermoplastic molding composition as claimed in claim 1, wherein a21) and b1) are both a $C_1$–$C_8$-acrylate or methacrylate.

11. A thermoplastic molding composition as claimed in claim 1, wherein all of the olefinic double bonds of component C) have been hydrogenated.

12. A thermoplastic molding composition as claimed in claim 1, in which in B), b3) is from 0 to 20% by weight of one or more other monomers and in C), c2) is from 30 to 70% by weight of butadiene.

* * * * *